(12) United States Patent
Manikani et al.

(10) Patent No.: US 12,626,353 B2
(45) Date of Patent: May 12, 2026

(54) MACHINE LEARNING-BASED DEFECT ANALYSIS REPORTING AND TRACKING

(71) Applicant: Schlumberger Technology Corporation, Sugar Land, TX (US)

(72) Inventors: Sunil Manikani, Pune (IN); Olga Domanova, Beijing (CN); Krishna Kumar Narayanan Nair, Pune (IN); Federico Sporleder, Pune (IN); Ali Rezaei, Houston, TX (US); Nasser Ghorbani, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 250 days.

(21) Appl. No.: 18/541,002

(22) Filed: Dec. 15, 2023

(65) Prior Publication Data

US 2024/0202907 A1 Jun. 20, 2024

Related U.S. Application Data

(60) Provisional application No. 63/387,529, filed on Dec. 15, 2022.

(51) Int. Cl.
*G06T 7/00* (2017.01)
*G06T 3/4053* (2024.01)
(Continued)

(52) U.S. Cl.
CPC .......... *G06T 7/0008* (2013.01); *G06T 3/4053* (2013.01); *G06T 7/10* (2017.01);
(Continued)

(58) Field of Classification Search
CPC ....... G06T 7/0008; G06T 3/4053; G06T 7/10; G06T 7/62; G06T 2207/20081;
(Continued)

(56) References Cited

U.S. PATENT DOCUMENTS 11,468,551 B1 * 10/2022 Amouie ................ G06F 18/214
2020/0315587 A1 10/2020 Toporek et al.
(Continued)

FOREIGN PATENT DOCUMENTS

EP 3929812 A1 12/2021
WO 2021062536 A1 4/2021

OTHER PUBLICATIONS

International Search Report and Written Opinion of International Patent Application No. PCT/US2023/084157 dated on Apr. 16, 2024, 12 pages.
(Continued)

*Primary Examiner* — Jennifer Mehmood
*Assistant Examiner* — Dustin Bilodeau
(74) *Attorney, Agent, or Firm* — Kyle R. Miiller

(57) ABSTRACT

Methods, systems, and computer program products are provided for defect detection in industrial inspections. In one embodiment, captured images are ingested from a robotic platform equipped with imaging sensors. The ingested images are analyzed using an image analysis pipeline and a plurality of labeled images to generate a plurality of segmentation masks. In an environment shown in at least a subset of the plurality of ingested images, a plurality of environmental conditions are simulated to create an augmented plurality of labeled images. A defect analysis model is then trained with the augmented plurality of labeled images and the plurality of segmentation masks.

20 Claims, 16 Drawing Sheets

(51) Int. Cl.

| | |
|---|---|
| *G06T 7/10* | (2017.01) |
| *G06T 7/62* | (2017.01) |
| *G06V 10/764* | (2022.01) |
| *G06V 20/70* | (2022.01) |

(52) U.S. Cl.
CPC .............. *G06T 7/62* (2017.01); *G06V 10/764* (2022.01); *G06V 20/70* (2022.01); *G06T 2207/20081* (2013.01); *G06V 2201/07* (2022.01)

(58) Field of Classification Search
CPC . G06T 2207/20084; G06T 2207/30108; G06T 7/0004; G06V 10/764; G06V 20/70; G06V 2201/07; G06V 2201/06; G06V 10/82
USPC ......................................................... 382/141
See application file for complete search history.

(56) References Cited

U.S. PATENT DOCUMENTS

| | | | |
|---|---|---|---|
| 2021/0073972 A1 | 3/2021 | Wu et al. | |
| 2021/0406580 A1* | 12/2021 | Ferrato | G06V 10/764 |
| 2022/0358332 A1 | 11/2022 | Joze et al. | |
| 2022/0366558 A1* | 11/2022 | Bufi | G06V 10/82 |
| 2024/0104785 A1* | 3/2024 | Nash | G06N 3/0475 |
| 2024/0169514 A1* | 5/2024 | Xiang | G06T 7/001 |

OTHER PUBLICATIONS

"Automated Inspection System in the Oil and Gas Industry", retrieved from https://www.dmcinfo.com/latest-thinking/case-studies/view/id/568/automated-inspection-system-in-the-oil-and-gas-industry, DMC Inc., 03 Pages.
Emad et al., "DualSR: Zero-Shot Dual Learning for Real-World Super-Resolution", 2021, 10 pages.

* cited by examiner

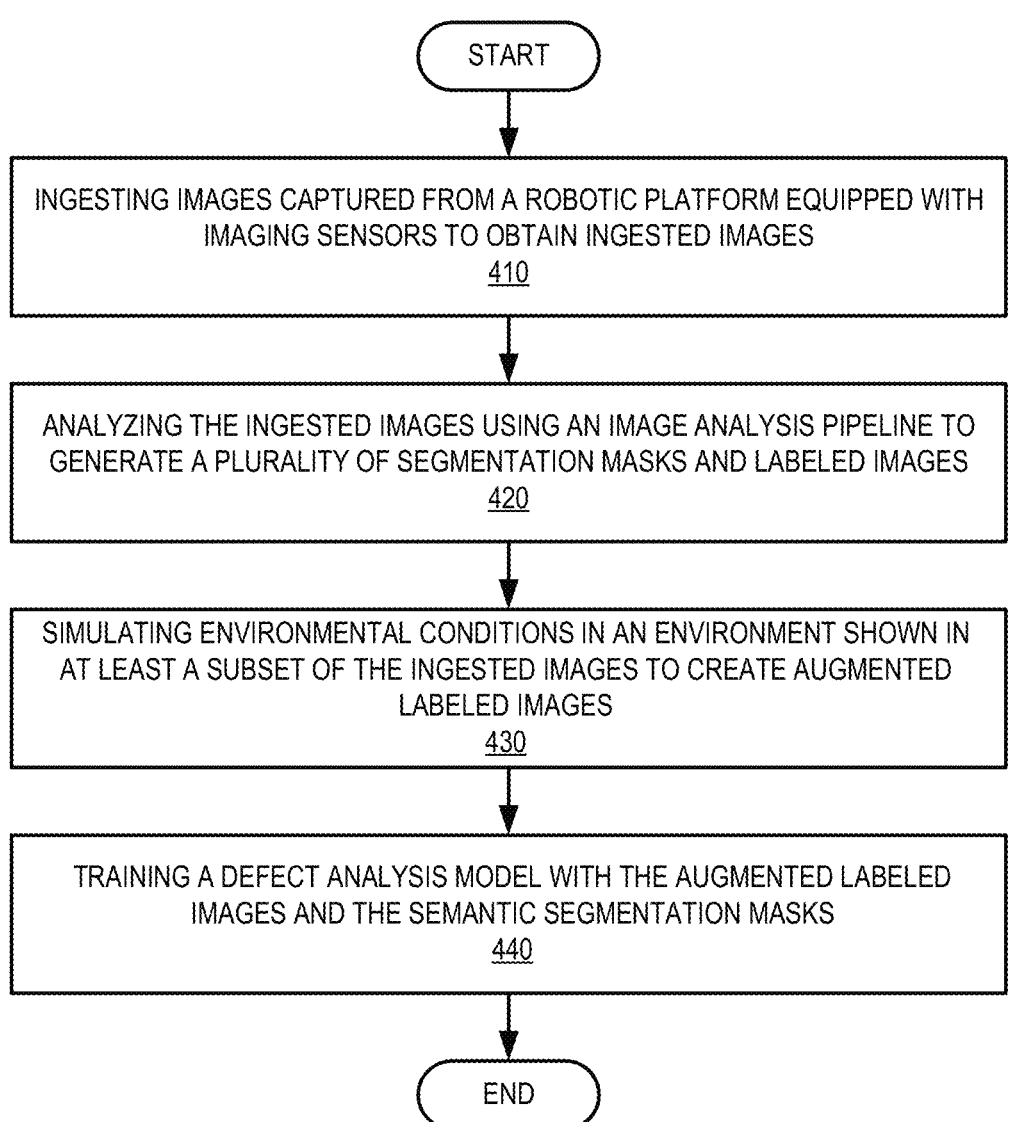

START

INGESTING IMAGES CAPTURED FROM A ROBOTIC PLATFORM EQUIPPED WITH IMAGING SENSORS TO OBTAIN INGESTED IMAGES
410

ANALYZING THE INGESTED IMAGES USING AN IMAGE ANALYSIS PIPELINE TO GENERATE A PLURALITY OF SEGMENTATION MASKS AND LABELED IMAGES
420

SIMULATING ENVIRONMENTAL CONDITIONS IN AN ENVIRONMENT SHOWN IN AT LEAST A SUBSET OF THE INGESTED IMAGES TO CREATE AUGMENTED LABELED IMAGES
430

TRAINING A DEFECT ANALYSIS MODEL WITH THE AUGMENTED LABELED IMAGES AND THE SEMANTIC SEGMENTATION MASKS
440

END

*FIG. 4*

Computing
System
1600

MACHINE LEARNING-BASED DEFECT ANALYSIS REPORTING AND TRACKING

CROSS-REFERENCE TO RELATED APPLICATIONS

This application is a nonprovisional application of, and thereby claims benefit to, U.S. Provisional application 63/387,529 filed on Dec. 15, 2022, which is incorporated herein by reference in its entirety.

BACKGROUND

In the oil and gas industry, the terms "upstream," "midstream," and "downstream" refer to the various stages of the process, from extracting raw materials to delivering the final products to consumers.

Upstream involves the exploration and production of crude oil and natural gas. Activities in this stage include searching for potential underground or underwater oil and gas fields, drilling exploratory wells, and then drilling and operating the wells that recover and bring the crude oil or raw natural gas to the surface. Upstream is often known for its elevated risk and high investment, as well as for its technological innovation in exploration and extraction techniques.

Midstream refers to the transportation, storage, and processing of oil and gas. After extraction, the raw materials are transported to refineries, which can be done through pipelines, tanker ships, or rail. Storage facilities are also considered part of the midstream sector. Processing might include the refining of crude oil or the purifying of natural gas. The midstream sector serves as the link between the remote locations of crude oil and gas reserves and the downstream sector.

Downstream involves the refining of petroleum crude oil and the processing and purifying of raw natural gas, as well as the marketing and distribution of products derived from crude oil and natural gas. The downstream industry provides consumers with a wide range of finished products, including gasoline, diesel oil, jet fuel, natural gas, plastics, and a variety of other energy sources and materials. This sector is characterized by its focus on product distribution and retailing aspects.

Each of these sectors has its own unique challenges and focuses, from the high-risk, high-investment world of exploration in the upstream sector to the process and marketing-intensive activities of the downstream sector. Industrial inspection for maintaining the safety and efficiency of various facilities have traditionally been performed manually. This approach, however, poses challenges in terms of accessibility, accuracy, and efficiency. In particular, industries like oil and gas may have more robust and safe inspection methods, where operations in remote or hazardous environments are commonplace.

Recent advancements in robotics and image processing have provided opportunities to improve these inspections. Previous attempts at automating industrial inspections have included the use of drones or wheeled robots equipped with cameras. Robots equipped with cameras and sensors can access difficult areas, but may lack the sophisticated software to accurately identify defects such as leaks, cracks, or structural weaknesses.

These systems, while offering improved access to challenging areas, still largely depend on human operators for image analysis. Current systems in the market mainly rely on basic image capture followed by manual analysis, which is time-consuming and prone to human error. The use of standard convolutional neural networks (CNNs) in some systems has improved defect recognition, but these models are often limited by the quality and diversity of the training data, especially under varied environmental conditions.

SUMMARY

In general, embodiments are directed to methods, systems, and computer program products for defect detection in industrial inspections. In one embodiment, a method for defect detection includes ingesting images captured from a robotic platform equipped with imaging sensors. The method includes analyzing the ingested images using an image processing pipeline to generate a plurality of segmentation masks and a plurality of labeled images. The method additionally includes simulating a plurality of environmental conditions in an environment shown in at least a subset of the plurality of ingested images to create an augmented plurality of labeled images. The method further includes training a defect analysis model with the augmented plurality of labeled images and the plurality of segmentation masks.

Other aspects of the invention will be apparent from the following description and the appended claims.

BRIEF DESCRIPTION OF DRAWINGS

FIG. 4 shows a flow chart for defect detection in industrial applications, in accordance with one or more embodiments.

Like elements in the various figures are denoted by like reference numerals for consistency.

DETAILED DESCRIPTION

In general, the one or more embodiments are directed to automatic image processing to automatically discover problematic issues in a real environment.

One or more embodiments combine image augmentation techniques with artificial intelligence algorithms to enhance defect recognition accuracy in real-world conditions. Through integration between the robotic hardware and the defect recognition software, one or more embodiments improve the efficiency and autonomy of these systems.

While the one or more embodiments may be applied to image processing of images of any real environment, one example of the one or more embodiments is in the field of oil and gas automation. Oil and gas automation may use sensors based on the internet of things (IoT), drones, robotic automation, predictive and self-learning systems to increase productivity, and use of machine learning.

The one or more embodiments relate to a robust and flexible platform for automated defect recognition and classification in oil and gas facilities, that result in the completion of image defect analysis after or during the capturing of images. Images include single frame images or video.

Machine learning-based defect analysis reporting and tracking may include operations of ingesting images, labeling the defects in the images, perturbing the images with the labels to obtain an augmented set of images to simulate different environmental conditions, generating segmentation masks from the augmented set of images, and training a defect analysis model. For visual quality control, super resolution may be performed. Using the trained defect analysis model, when a new defect is received the trained defect analysis model may be used to identify the defect.

Figure 1:
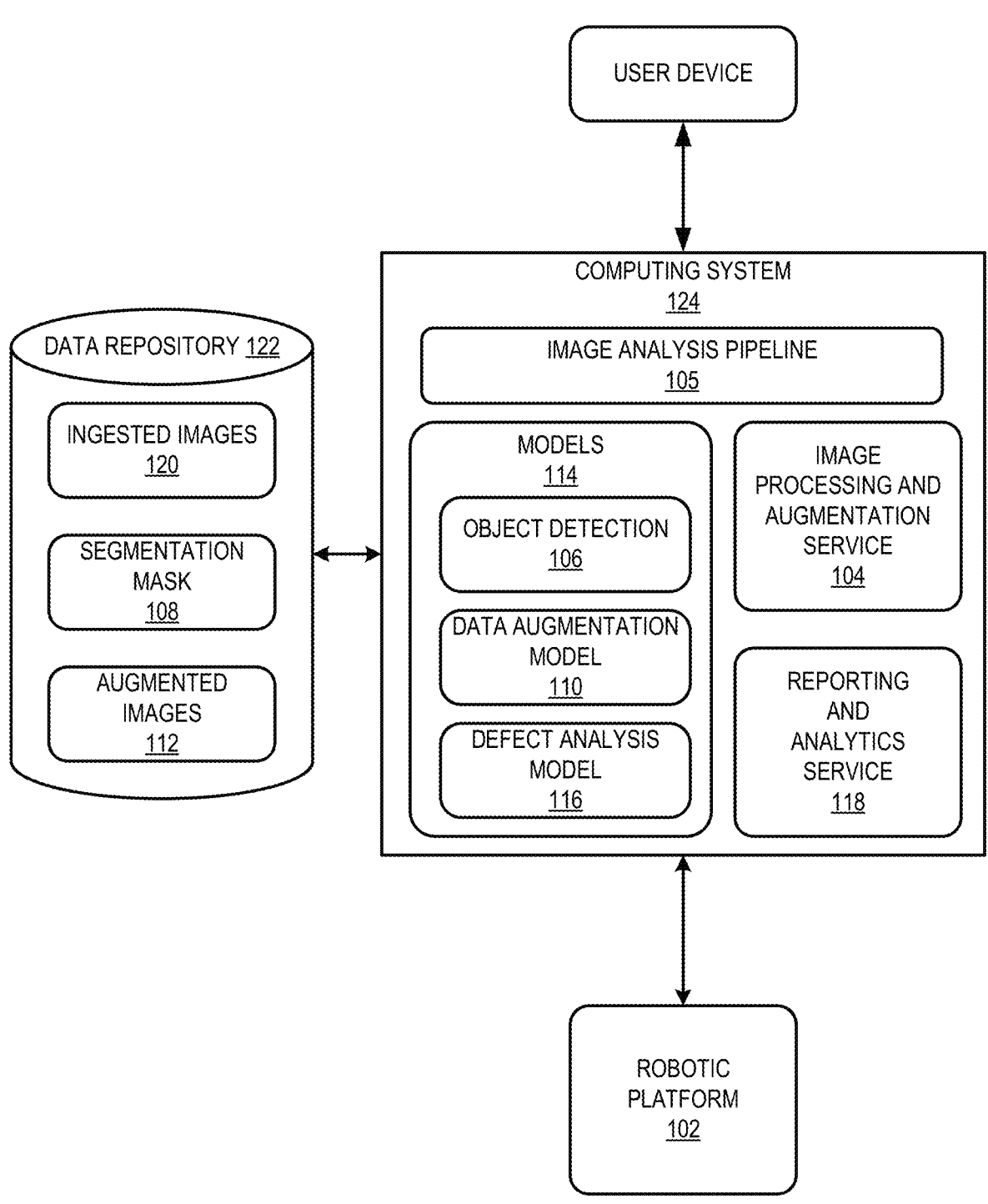
FIG. 1 shows a defect analysis system, in accordance with one or more embodiments.

Turning to FIG. 1, a defect analysis system is shown according to illustrative embodiments. The system of FIG. 1 can be used to analyze defects in an industrial environment.

The system shown in FIG. 1 may include the robotic platform(s) (102). However, in some embodiments, the system does not include the robotic platform(s) (102) but rather accesses a third-party robot. In any case, the robotic platform(s) (102) is a robotic device (e.g., an arm, a claw, a drill, an android-like device, a drone, autonomous vehicle, a robotic animal, etc.) which may be static or mobile. The robotic platform(s) (102) may include a propulsion system, such as wheels, tracks, legs, etc., and the actuators and/or motors used to drive the propulsion system.

The robotic platform(s) (102) operates in a real space and can be designed for specific environments depending on the operational context. For example, the robotic platform(s) (102) can include one or more surface unit(s), aerial unit(s), and/or submersible (subterranean) unit(s). In some embodiments, the robotic platform(s) (102) comprises a four-legged structure for stability and maneuverability in different terrains. Each leg has actuators for movements such as climbing and crawling.

The robotic platform(s) (102) can include environmental sensors like temperature, humidity, and gas detectors for operation in industrial environments. A high-resolution camera with optical zoom, mounted on a stabilizing gimbal, captures clear images during movement. The robotic platform(s) (102) is powered by a rechargeable battery pack, ensuring operational longevity. A wireless communication module can be provided for data transmission to a control unit or cloud server. Onboard data storage records images and sensor data, with capabilities for cloud synchronization. Ingested images (120) captured by the robotic platforms can be stored as part of an image data set that can be used to train models (114). The ingested images (120) are images captured by the robotic platform and ingested into the system.

As used herein, "ingested images" is visual data, encompassing both still images and video content. The images can be captured and/or stored in various standard formats. For example, for still images, ingested images (120) may include file types such as but not limited to JPEG, PNG, and TIFF. For video, ingested images (120) may include file types such as but not limited to MP4, AVI, and MOV.

The robotic platform(s) (102) connects with the image processing and augmentation service (104) for enhancing and augmenting captured images. The image processing and augmentation service (104) is software for processing and preparing images captured for defect analysis. Image processing and augmentation service (104) can include various stages to prepare the images for analysis, such as pre-processing, morphological operations, edge detection, pattern recognition, image annotation, and/or data augmentation.

The image processing and augmentation service (104) includes an image analysis pipeline (105) that is configured to segment the image and precisely locate and identify defects in images. In some embodiments, the image analysis pipeline (105) involves a series of filters and image adjustments to isolate and identify desired features within an image. For example, the image may undergo color space conversion (e.g., RGB to grayscale or Lab color space) to simplify the data and emphasize contrast. Noise reduction filters such as Gaussian blur may be applied to smooth the image, followed by edge detection algorithms (like Sobel or Canny) to identify boundaries. Thresholding techniques are then used to create binary images, isolating regions of interest from the background. Morphological operations such as dilation and erosion help refine these regions, improving the accuracy of the segmentation. Contour detection algorithms can outline the precise boundaries of the segmented regions, and masks may be applied to the original image to highlight or extract the segmented features. These steps, sequentially applied in the image analysis pipeline (105), transform the raw image data into a segmented map, distinguishing and isolating specific parts of the image for further analysis or processing.

In other embodiments, the image processing and augmentation service (104) may be connected to or include an object detection model (106). The object detection model (106) is a machine learning model that is configured to segment the image to precisely locate and identify defects in images. In one or more embodiments, the object detection model performs pixel-level segmentation. For example, pixels may be annotated as being part of the object or not part of a detected object. As another example, pixels may be annotated as being part of the boundary of a detected object. The object detection model (106) may be configured to detect various types of objects, as well as more than one object in a single image. The object detection model (106) may be or include a mask RCNN (Region-based convolutional neural network), Faster-RCNN, and/or RFCN (Region-based Fully Convolutional Network) such as the U-Net Architecture. In some embodiments, the object detection model (106) employs a series of convolutional layers that extract features from the images, and then generates segmentation masks that identify potential objects and the potential objects' locations within the images.

The segmentation by the object detection model (106) classifies each pixel in the image into a relevant category, effectively segmenting the image into different regions based on the detected objects. Each of the different regions can be saved as a segmentation mask(s) (108). The masks outline the shape of each object, providing a clear distinction between the objects of interest and the rest of the image.

As used herein, "automatic image annotation" refers to the process of automatically assigning metadata, such as keywords or labels, to a digital image. The metadata may be in the form of annotation tags. The automatic image annotation process leverages deep learning models, such as convolutional neural networks (CNNs), recurrent neural networks (RNNs), deep neural networks (DNNs), long-short-term memory networks (LSTMs), and stacked auto-encoders (SAEs), to analyze and understand the contents of an image. The metadata can be used for indexing and efficient searching in image retrieval systems, or to form a taxonomy used when training a defect analysis model.

The image processing and augmentation service (104) further includes functionality to perform data augmentation, such as by using or including a data augmentation model (110). The data augmentation model (110) is configured to create additional training images through various forms of transformation to existing images. Specifically, the data augmentation model (110) is configured to simulate possible environmental conditions to expand the set of training data. Environmental conditions are conditions that affect the capture of the images. For example, environmental conditions may include lighting variations (e.g., places of uneven shade and light sections, variations in color across an image, different variations from white light, etc.), weather (e.g., bright sun, fog, darkness with a camera that does not support dark environments, etc.), wear of the camera (e.g., cracked or scratched lens, tilted angles of the robotic platform), movement of the robotic platform. By artificially expanding the size and diversity of images that are used to train the defect analysis model (116), data augmentation helps in effectively training the defect analysis model (116) even when the amount of actual data is limited. For images, the defect analysis model may be configured to simulate the environmental conditions by performing various perturbations. The perturbations may include geometric transformations (e.g., rotating, flipping, scaling, cropping images, etc.) as well as photometric transformations (e.g., altering brightness, contrast, adding noise, etc.).

Geometric transformations help the model learn to recognize defects of different orientations, positions, and sizes. Random cropping may aid the defect analysis model (116) identifying defects that are partially obscured or not centrally located in the image.

Photometric transformations simulate various environmental conditions in real-world industrial environments. Such adjustments help the defect analysis model (116) to detect defects in various lighting environments. Noise injection, where digital noise is added to the images, may mimic the effect of environmental conditions, such as dust or smoke that might interfere with image clarity in industrial settings.

The data augmentation model (110) adds images to the ingested images. The additional images and the ingested images form an augmented set of images (i.e., augmented images (112)). Collectively, the augmented images (112) form an augmented data set that is used to train models (114)

for defect analysis model (116). In this example, defect analysis model (116) is one of models (114) that includes one or more types of deep learning algorithms, such as a convolutional neural network (CNN) having several layers, each performing a specific function.

In the CNN architecture, a convolutional layer applies various filters to the input data to create feature maps. These filters detect features such as edges, colors, or textures in images. An activation function, often a Rectified Linear Unit (ReLU), is applied to introduce non-linearity into the network, allowing it to learn more complex patterns. A pooling or subsampling layer reduces the spatial size of the feature maps, decreasing the computational load and the number of parameters in the network, and control overfitting. One or more fully convolutional layers follow the pooling layers, taking the high-level filtered information from the prior layers, and classifying the input data into various categories based on the augmented dataset. An output layer provides the classification results.

Continuing with the computing system (124), the reporting and analytics service (118) is software designed to process and analyze the data collected by the system's other components. The reporting and analytics service (118) is configured to compile, organize, and present the data into reports that are accessible and informative for users. The reports might include statistical summaries that show trends in the data, such as an increase in a particular type of defect over time. The reports may further include visualizations. The visualizations can take the form of graphs, charts, or heat maps that provide a visual representation of the defects' distribution across different areas of the inspected equipment or facility.

The reporting and analytics service (118) may include or use one or more libraries for statistical analysis, data visualization, and report generation. For example, libraries may include Pandas and NumPy in Python, as well as other packages such as Sklearn, Matplotlib, and or Statsmodels, to manipulate and analyze the large datasets of ingested images. Using the output of the libraries, the computing system (124) may calculate various statistical measures, such as mean, median, standard deviations, and correlations between defects detected in the ingested images. For data visualization, the reporting and analytics service (118) may interface with libraries such as Matplotlib or Seaborn (also in Python) to obtain a range of functions for creating a variety of charts and graphs, including line charts, bar charts, scatter plots, and heat maps. For report generation, the reporting and analytics service (118) may interface with libraries such as ReportLab or JasperReports, as well as other structured data such as csv file and/or excel tables, to design templates that can be automatically populated with data.

The ingested images (120), segmentation masks (108), and augmented images (112) can be stored in a data repository (122). In one or more embodiments, the data repository (122) is any type of storage unit and/or device (e.g., a file system, database, data structure, or any other storage mechanism) for storing data. Further, the data repository (122) may include multiple different, potentially heterogeneous, storage units and/or devices.

Figure 2:
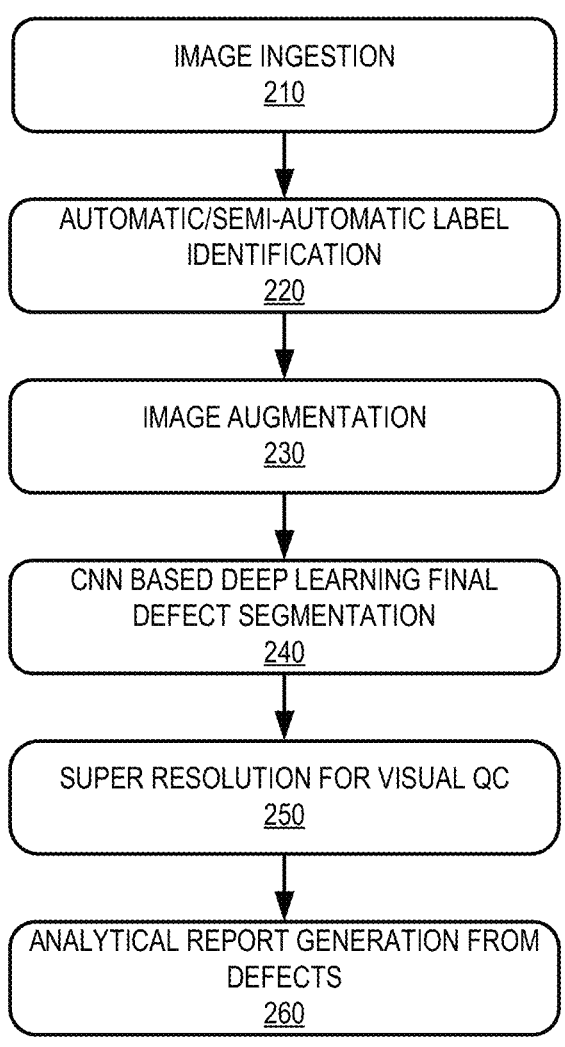
FIG. 2 shows an example flow diagram in accordance with one or more embodiments.

FIG. 2 shows an example flow diagram in accordance with one or more embodiments. As shown in FIG. 2, the blocks may include ingesting images (210), automatic or semi-automatic label identification (220), image augmentation (230), CNN based deep learning final defect segmentation (240), super resolution for visual quality control (250), and analytical report generation from defects or other aspects of an object in the environment (260). One or more embodiments may include tracking defects or other aspects of objects in the image and updating generated reports over time. Each of the blocks are described below.

Block 210 includes ingestion of images. Images may be copied into a staging directory which may or may not be on cloud or an EDGE (i.e., distributed computing) device.

Block 220 includes automatic or semi-automatic label identification. For example, automatic label identification may be performed by a pre-trained machine learning model that has been trained on several defect types in past. For example, automatic label identification may be performed by using a semi-automatic approach which involves conventional image processing techniques, transformations of color models and color splitting, advanced filtering, morphological operations, local and global adaptive thresholding. Block 220 can be performed either fully automatically or semi-automatically.

Block 230 includes image augmentation (230). Image augmentation may enable the machine to perform in tricky conditions (e.g., Low light/fog, sensor noise etc.) by perturbing the images to create new images as described above. Block 230 may include training a CNN, on several augmented images.

Block 240 includes final defect segmentation (240) that may include a CNN. Intermediate output of the model may be a defect mask. However, output from the machine learning model may include additional outputs, such as location, size, and statistics of the defect. One or more embodiments include similarity in addition to object detection.

Block 250 may include training a super resolution machine learning model (250) to improve the resolution to output an increased resolution image. The increased resolution image may improve visual inspection and quality control. Image resolution of the ingested images may vary. The super resolution machine learning model may be trained using unsupervised training.

Block 260 may include quantitatively reporting (260) the defects determined from segmentation masks. The segmentation masks may be obtained by predictions of the computing system which is trained in block 240. The report may be generated by splitting images into quadrilles and determining statistics about the quadrilles of the image. For example, the report may include a distribution of defects in the quadrilles. The report may include relevant statistical analysis, such as location, area surface covered, and defect changes over time.

Using the example of FIG. 2, a user may pass images of varied sizes to the machine learning network. For example, the network can be trained on a large image or used on any resolution image. For video, the input may be frame by frame selections of a video stream. The output of the model may be a segmentation mask.

One or more embodiments may be used to perform oil spill detection in Oil and Gas facilities, or corrosion detection in Oil and Gas facilities.

The one or more embodiments may be used in other environments. For example, the one or more embodiments may be used to perform solar cell defect analysis. Thus, the one or more embodiments represents a generic framework where defects are to be detected in the images of PV (photovoltaic) panels. As another example, one or more embodiments may be applied to automatically discovering wind turbine blade image defects.

Figure 3A:
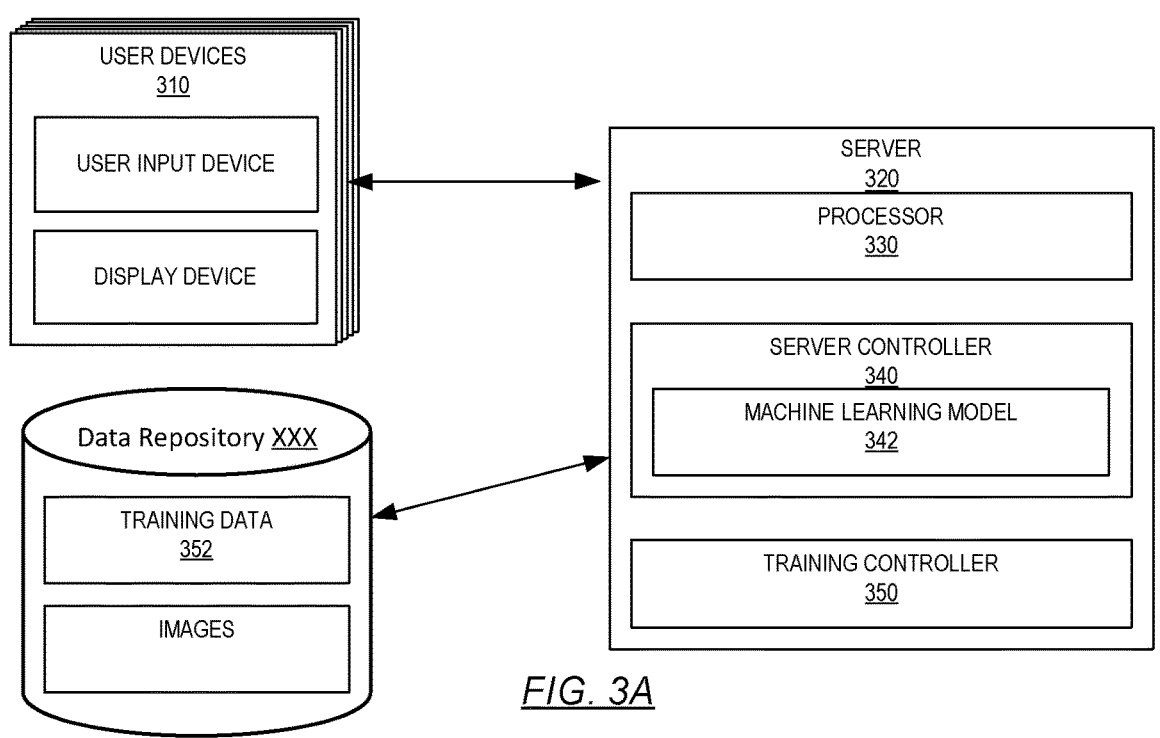
FIGS. 3A and 3B show a computing system, in accordance with one or more embodiments.

FIG. 3A shows a computing system. User devices (310) include a user input device and a display device to interact with the system. The computing system also includes a server (320) including a processor (330), a server controller (340) executable by the processor, and a training controller (350) executable by the processor. The server controller controls execution of a machine learning model (342), in the manner described elsewhere herein. The training controller (350), described in FIG. 4B, trains the machine learning model (342), which can be the defect analysis model (116) of FIG. 1.

Figure 3B:
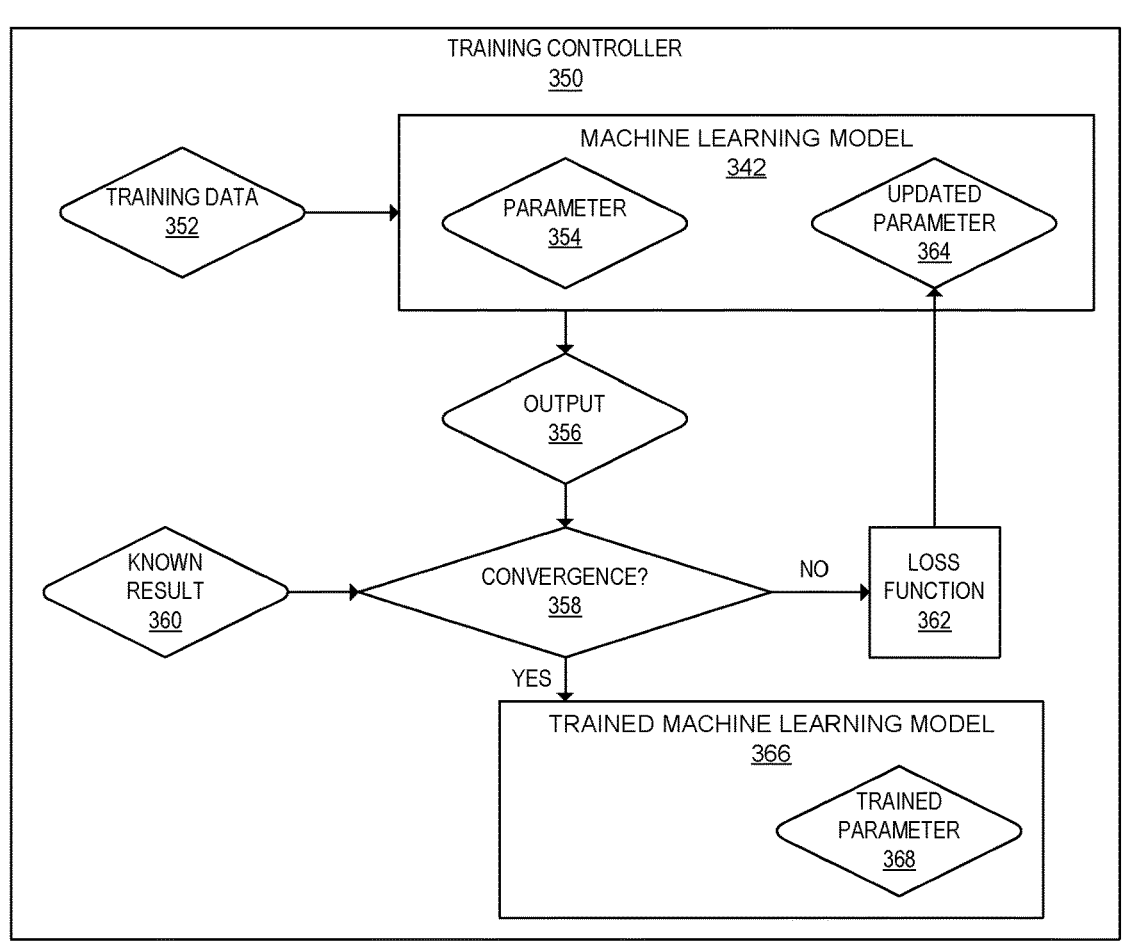

Attention is turned to FIG. 3B, which shows the details of the training controller (350). The training controller (350) is a training algorithm, implemented as software or application specific hardware, which may be used to train one or more of the machine learning models described with respect to FIG. 2.

In general, machine learning models are trained prior to being deployed. The process of training a model, briefly, involves iteratively evaluating a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (342)) is applied to unknown images in order to make predictions.

In more detail, training starts with training data (352). The training data (352) is data for which the final result is known with certainty. For example, if the machine learning task is to identify whether two names refer to the same entity, then the training data (352) may be naming pairs for which it is already known whether any given name pair refers to the same entity.

The training data (352) is provided as input to the machine learning model (342). The machine learning model (342), as described before, is an algorithm. However, the output of the algorithm may be changed by changing one or more parameters of the algorithm, such as the parameter (354) of the machine learning model (342). The parameter (354) may be one or more weights and biases, the application of a sigmoid function, a hyperparameter, or possibly many different variations that may be used to adjust the output of the function of the machine learning model (342).

One or more initial values are set for the parameter (354). The machine learning model (342) is then executed on the training data (352). The result is an output (356), which is a prediction, a classification, a value, or some other output which the machine learning model (342) has been programmed to output.

The output is provided to a convergence process (358). The convergence process (358) compares the output (356) to a known result (360). A determination is made whether the output (356) matches the known result (360) to a predetermined degree. The pre-determined degree may be an exact match, a match to within a pre-specified percentage, or some other metric for evaluating how closely the output (356) matches the known result (360). Convergence occurs when the known result (360) matches the output (356) to within the pre-determined degree.

If convergence has not occurred (a "no" at the convergence process (358)), then a loss function (362) is generated. The loss function (362) is a program which adjusts the parameter (354) in order to generate an updated parameter (364). The basis for performing the adjustment is defined by the program that makes up the loss function (362), but may be a scheme which attempts to guess how the parameter (354) may be changed so that the next execution of the machine learning model (342) using the training data (352)

with the updated parameter (364) will have an output (356) that more closely matches the known result (360).

In any case, the loss function (362) is used to specify the updated parameter (364). As indicated, the machine learning model (342) is executed again on the training data (352), this time with the updated parameter (364). The process of execution of the machine learning model (342), execution of the convergence process (358), and the execution of the loss function (362) continues to iterate until convergence.

Upon convergence (a "yes" result at the convergence process (358)), the machine learning model (342) is deemed to be a trained machine learning model (366). The trained machine learning model (366) has final parameters, represented by the trained parameter (368).

During deployment, the trained machine learning model (366) with the trained parameter (368) is executed again, but this time on the unknown data for which the final result is not known. The output of the trained machine learning model (366) is then treated as a prediction of the information of interest relative to the unknown data.

While FIGS. 1-3 show a configuration of components, other configurations may be used without departing from the scope of the claims. For example, various components may be combined to create a single component. As another example, the functionality performed by a single component may be performed by two or more components.

Turning to FIG. 4, a flow chart is shown for defect detection in industrial applications according to illustrative embodiments. The flow chart of FIG. 4 can be implemented using one or more components of FIGS. 1-3.

At Block 410, a plurality of images are ingested from a robotic platform to obtain a plurality of ingested images. The images are captured with imaging sensors equipped to the robotic platform.

The platform, such as robotic platform(s) (102), systematically scans the area of interest, gathering comprehensive visual information. The data, which includes raw images and video feeds, along with any associated metadata, is then uploaded to the system for further processing.

Images captured by the robotic platform is transferred to the system for processing. Once the images or videos are captured, they can be stored temporarily on the robotic platform's onboard storage. From there, a data transfer protocol is initiated. The transfer can occur in real-time, where the data is wirelessly transmitted from the robotic platform to the central processing system as it is captured, using wireless communication technologies such as Wi-Fi, 5G, or other industrial communication standards.

Where real-time transmission is not feasible due to environmental factors or bandwidth limitations, the data is first stored on the robotic platform and then physically retrieved or transmitted to the central system. The data retrieval could involve manually downloading the data from the robotic platform or establishing a wired connection to a network for data transfer.

The ingested data may undergo initial checks for integrity and quality. The data can be indexed and stored, making it ready for subsequent steps of processing and analysis. The indexing may include metadata tagging, where each image or video is tagged with information such as the date and time of capture, location, and other relevant details.

At Block 420, the ingested images are analyzed using an image analysis pipeline to generate multiple segmentation masks and multiple labeled images. The image analysis pipeline can be implemented as part of an intelligent image processing and segmentation pipeline that segments the images by distinguishing between different areas of the images, isolating potential defect areas from the rest of the image in a segmentation mask. This segmentation may involve identifying patterns, shapes, and textures indicative of defects.

In some embodiments, labeling may be performed manually using available open-source software. In other embodiments, labeling may be performed automatically or semi-automatically based on predefined criteria. In some embodiments where the identification process is executed automatically, labeling is performed automatically based on intelligent image processing, specifically designed to fit the application. In the automatic mode, the system uses pattern recognition algorithms to detect anomalies that may indicate defects, or with a semi-automatic approach that incorporates human oversight. Labeling may also be done semi-automatically using other pre-trained models, and the results should then be reviewed manually. In the semi-automatic mode, human operators review and confirm the labels assigned by the system, ensuring accuracy, and reducing the chances of false positives.

In some embodiments, the image analysis pipeline can employ a convolutional neural network that employs a U-net architecture. Using series of deep convolutional and pooling layers, the U-net architecture performs down-sampling and up-sampling of the images, along with skip connections between network layers, to segment the defects and generate the segmentation masks.

At Block 430, multiple environmental conditions are simulated in an environment shown in at least a subset of the ingested images to create augmented labeled images. The ingested images are digitally altered to simulate different environmental conditions, such as changes in lighting, perspective, or wear and tear. This augmentation creates a diverse training dataset that allows the defect detection model to learn and adapt to a wide range of scenarios. Examples of augmentations that may be performed are presented in FIGS. 6A-15D. In one or more embodiments, the augmentation is performed by digital processing techniques using a predefined set of perturbations. Each of a least a subset of perturbations may be individually applied to each of at least a subset of images to create a new image. Further, combinations of two or more perturbations in the set of perturbations may be automatically applied to create additional new images. The new image may be added to the set of images, thereby, augmenting the set of images.

At Block 440, a defect analysis model is trained with the augmented plurality of labeled images and the segmentation masks. The model is trained to recognize distinct types of defects, their characteristics, and typical appearances using the augmented dataset and segmentation masks generated by the CNN. The training process can be iterative, continuously refining the model based on its performance in identifying known defects.

In some embodiments, the defect analysis model is continually trained as new images are ingested. The new images may be added to the set of images, thereby, augmenting the set of images. The model can be trained to recognize new defects when those defects are labeled and used to train the model.

In some embodiments, the system applies super-resolution (SR) techniques to the augmented images to further enhance the defect detection process. For example, a dual-path architecture (DualSR) comprising a simultaneously trained upsampler and a downsampler may be employed, leveraging cycle consistency losses and masked interpolation loss to enhance visual quality while reducing artifacts.

These SR techniques improve the visual quality of the images, bringing out finer details and making it easier to identify subtle defects. Super-resolution may be used when dealing with high-quality control standards, as super-resolution allows for more precise and detailed inspections. This enhancement aids in more accurate defect analysis and contributes to the clarity of the images for human operators.

Analytical reports can be generated from the identified defects. These reports include comprehensive statistics and detailed information about the distribution and nature of the defects found. The reports aid in quality control providing insights into the defect trends, potential causes, and areas that should be further processed due to having defects. The reports may guide process improvements and decision-making in the industrial setting.

FIGS. 5A-5H show an example of a set of processed images demonstrating the steps of an image analysis pipeline. The sequence of images illustrates an example a process where an original image is analyzed to detect specific features, which are then isolated, outlined, and highlighted for further analysis or reporting. For example, the sequence of images of FIGS. 5A-5H may illustrate these steps of image analysis pipeline (105) of FIG. 1.

Figures 5A, 5B, 5C, 5D, 5E, 5F, 5G, 5H:
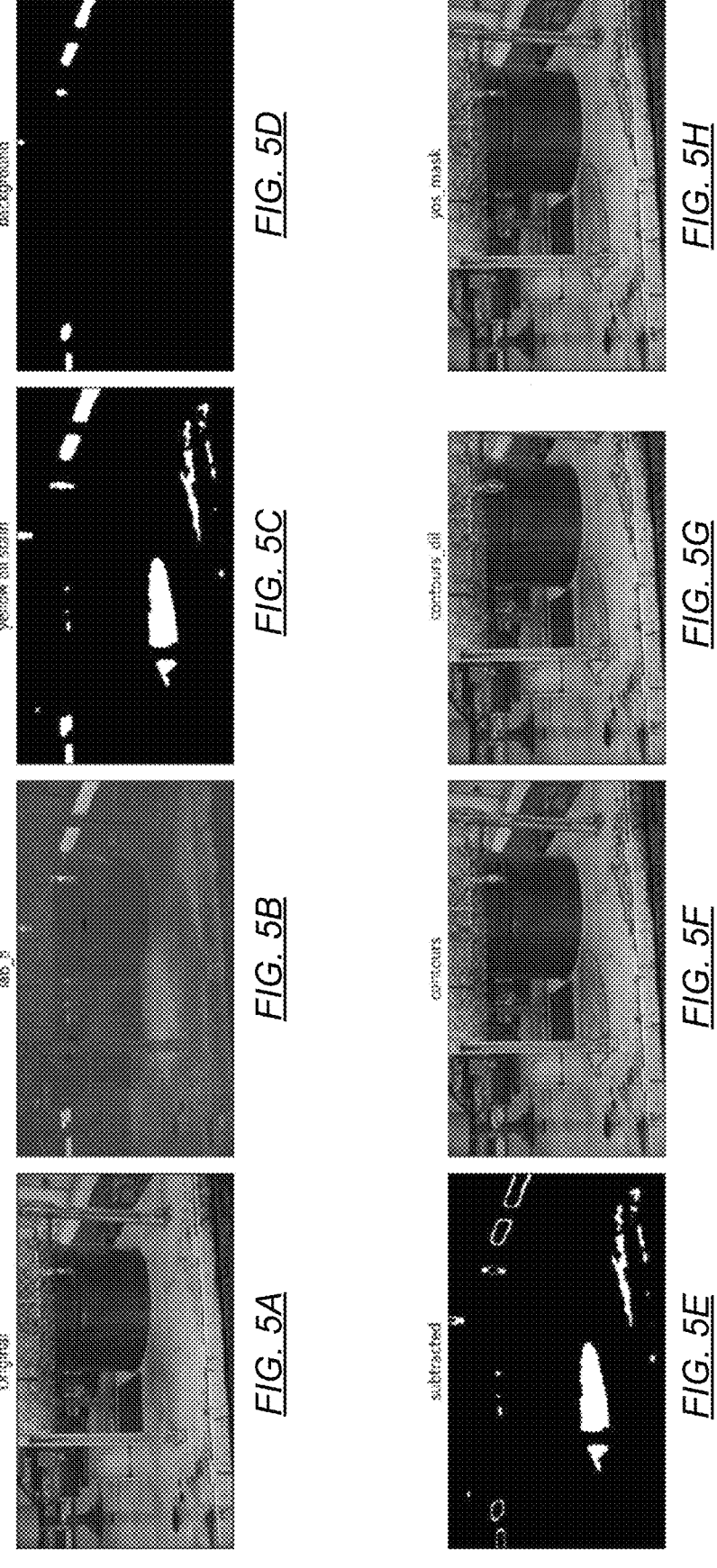
FIGS. 5A-5H show a set of processed images demonstrating the steps of an image analysis pipeline, in accordance with one or more embodiments.

FIG. 5A is an unprocessed original image of an industrial setting. FIG. 5A is one example of ingested images (120) of FIG. 1.

FIG. 5B is an image has been converted to a different color space, for example, the Lab color space, which separates the lightness (L) from the color information (a and b channels). FIG. 5B is shown in grayscale, indicating a single channel of the Lab color space, for example, the 'b' channel which carries color information from blue to yellow. The color conversion of Illustrated in FIG. 5B can be performed as a first step in the image analysis pipeline.

FIG. 5C is a binary image that highlights certain regions in white against a black background. At the step of the image analysis pipeline, a threshold is applied to the 'b' channel from the previous step to detect and isolate the areas of the image with yellow staining (i.e., oil stains).

FIG. 5D is another binary image where most of the image is black except for a few white spots. At the step of the image analysis pipeline, the areas representing background or non-interest regions are identified, for example by applying an inverse threshold to the 'b' channel.

FIG. 5E is a binary image showing only the areas of interest (the stains) highlighted in white. The image of FIG. 5E can be obtained by subtracting the background from the yellow oil stain, leaving only the areas of interest.

FIG. 5F is an image illustrating contour detection that can be implemented as part of the pipeline. For example, the image of FIG. 5F can be obtained as part of a step in the pipeline that overlays the detected contours of the areas of interest (the stains) onto the original image.

FIG. 5G is an image illustrating mask creation that can be implemented as part of the pipeline. Dilation is a morphological operation that is used to grow or thicken objects in the binary image of FIG. 5F. The mask is created by dilating the contours to cover the full extent of the oil stains.

FIG. 5H is an image showing the mask of FIG. 5G applied to the original image of FIG. 5A. FIG. 5H highlights the areas of interest in the figure, for example with a semi-transparent overlay.

FIGS. 6A-15D show examples of perturbations that may be applied in accordance with one or more embodiments. Referring now to FIGS. 6A-6D, a series of photographs of an oil stain are shown according to illustrative embodiments. Each image demonstrates increasing levels of shot noise, exemplifying image data augmentation for training defect analysis model (116) CNN for defect analysis. This progression in noise levels prepares the CNN to manage a variety of real-world conditions enhancing its ability to identify and analyze defects under various levels of visual interference.

Figure 6A:
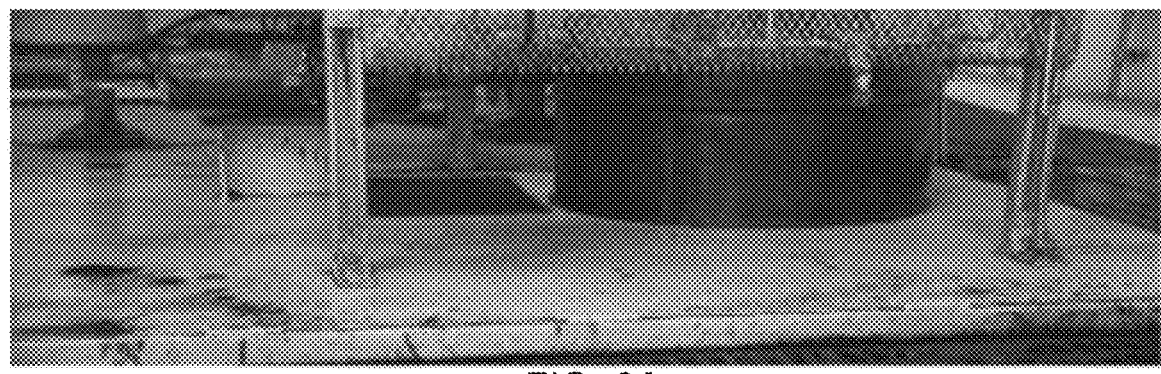
FIGS. 6A, 6B, 6C, and 6D show a series of photographs of an oil stain, in accordance with one or more embodiments.
Figure 6B:
Figure 6C:
Figure 6D:
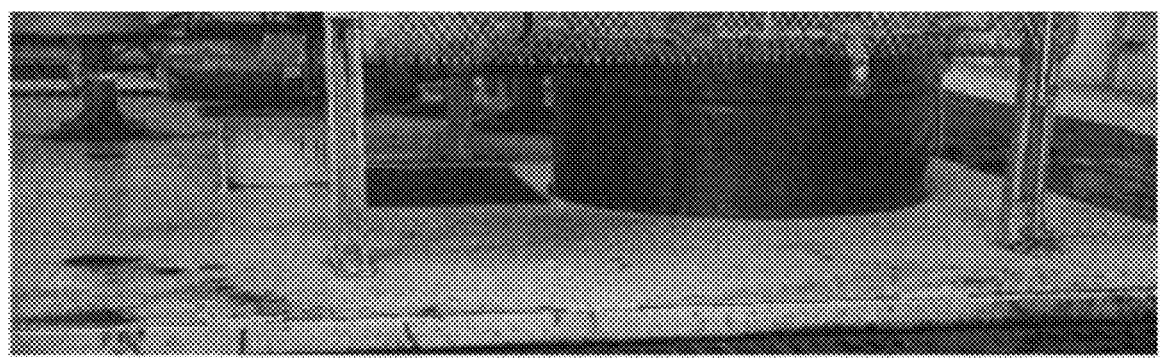
Figure 7A:
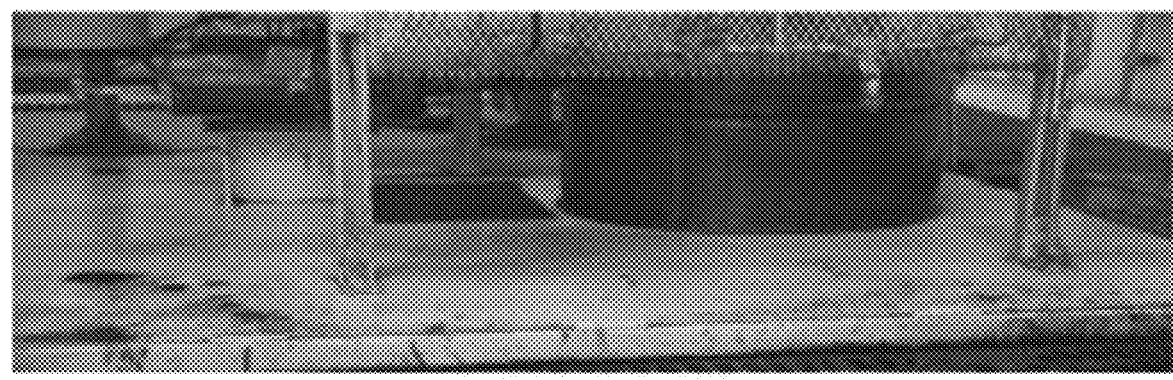
FIGS. 7A, 7B, 7C, and 7D show a series of photographs of an oil stain, in accordance with one or more embodiments.
Figure 7B:
Figure 7C:
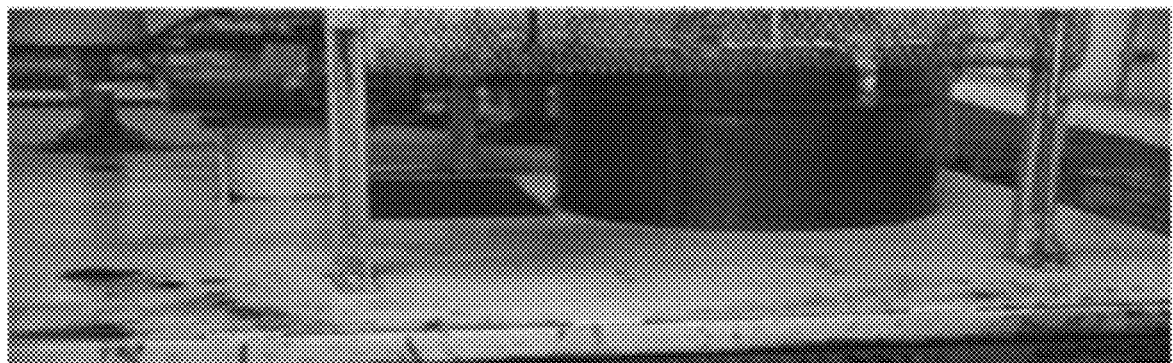
Figure 7D:
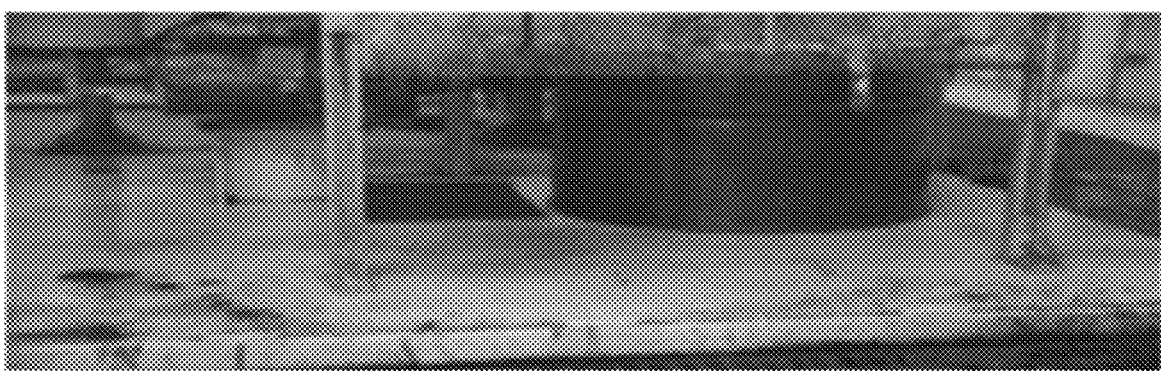
Figure 8A:
FIGS. 8A, 8B, 8C, and 8D show a series of photographs of an oil stain, in accordance with one or more embodiments.
Figure 8B:
Figure 8C:
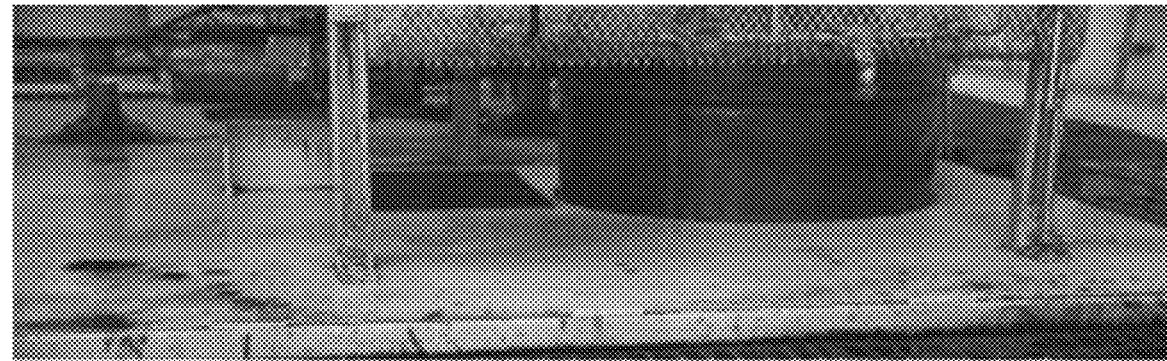
Figure 8D:
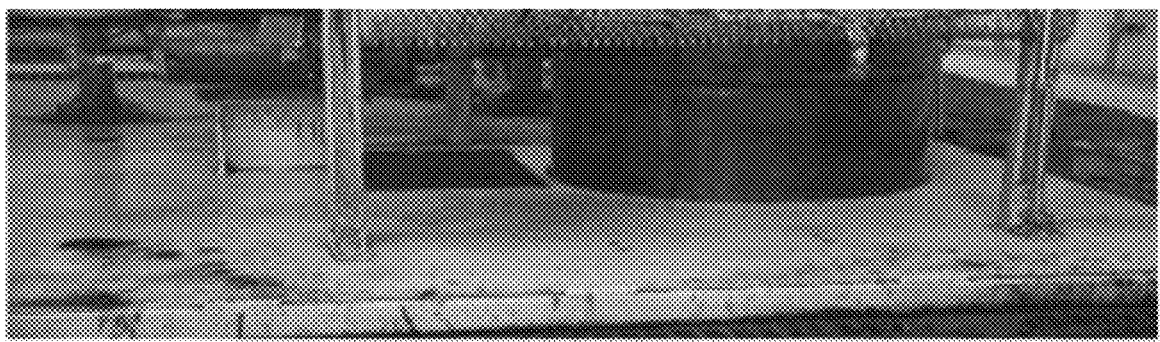
Figure 9A:
FIGS. 9A, 9B, 9C, and 9D show a series of photographs of an oil stain, in accordance with one or more embodiments.
Figure 9B:
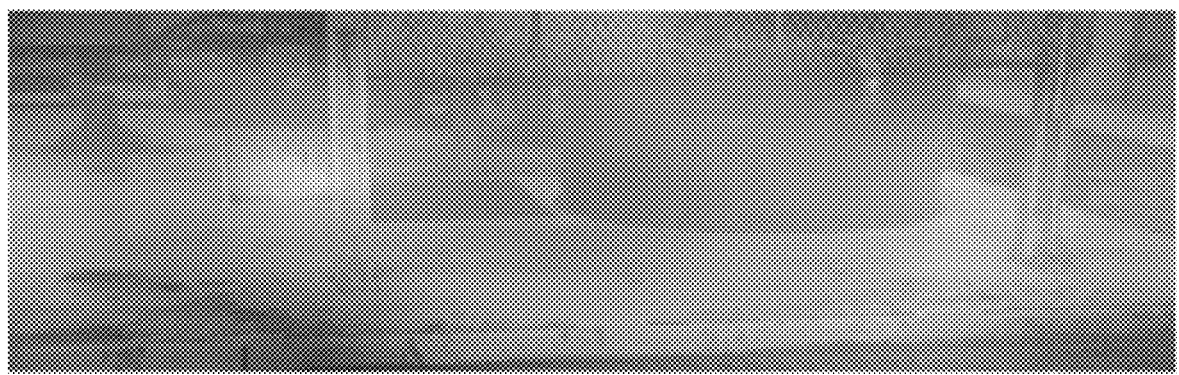
Figure 9C:
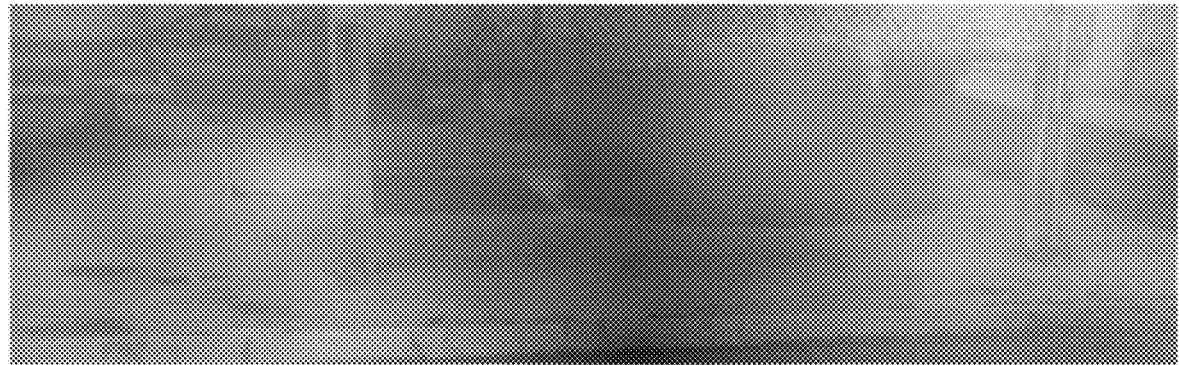
Figure 9D:
Figure 10A:
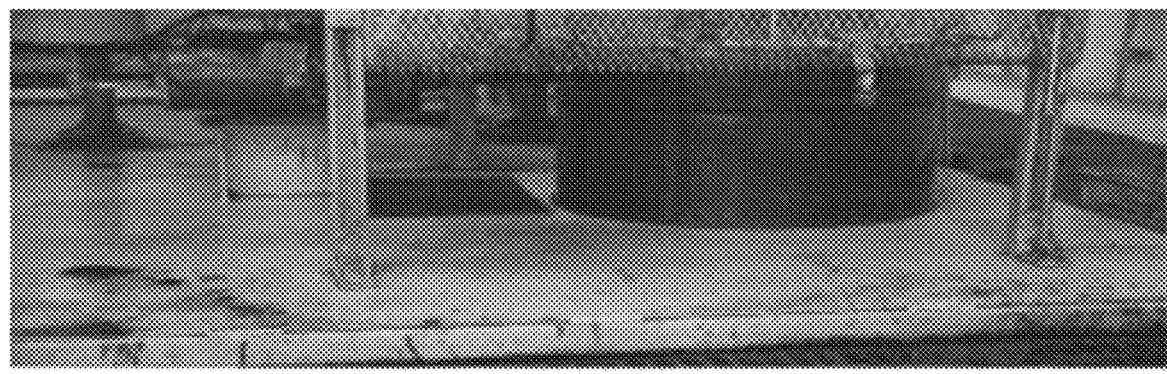
FIGS. 10A, 10B, 10C, and 10D show a series of photographs of an oil stain, in accordance with one or more embodiments.
Figure 10B:
Figure 10C:
Figure 10D:
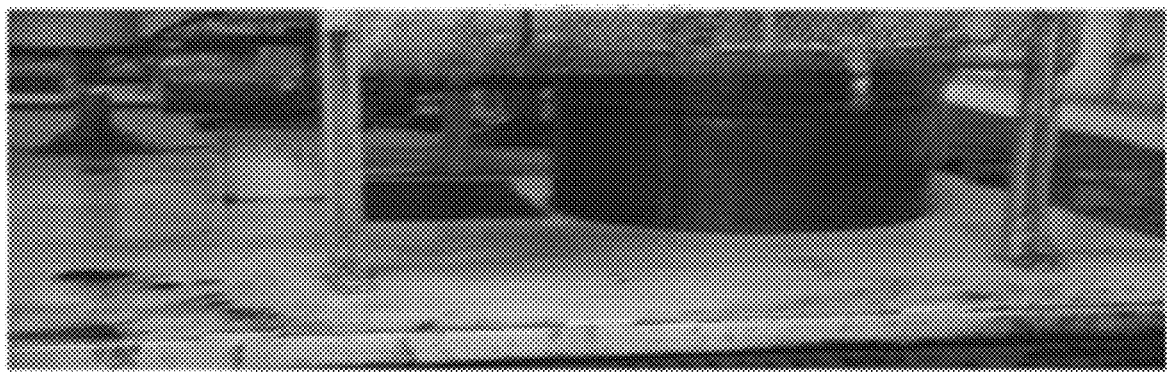
Figure 11A:
FIGS. 11A, 11B, 11C, and 11D show a series of photographs of an oil stain, in accordance with one or more embodiments.
Figure 11B:
Figure 11C:
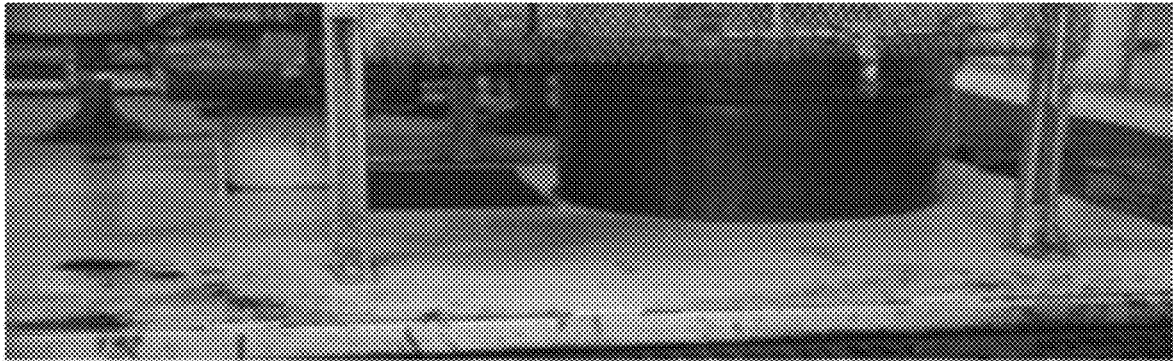
Figure 11D:
Figure 12A:
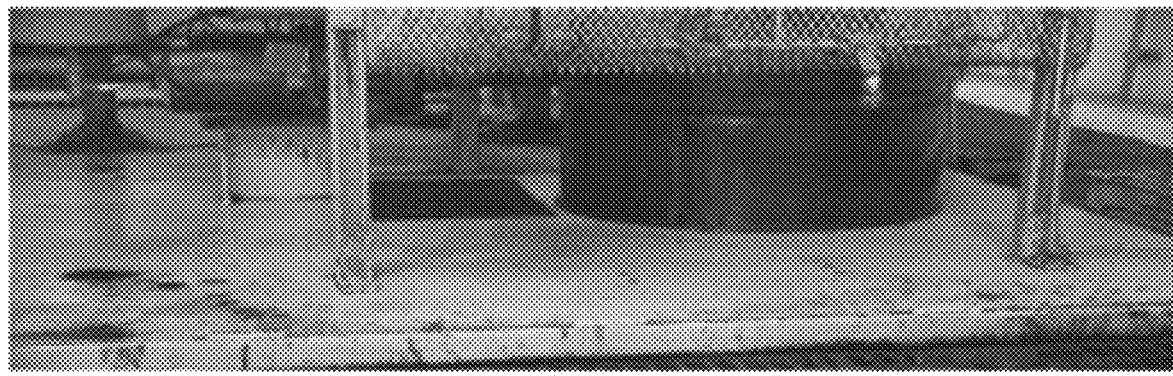
FIGS. 12A, 12B, 12C, and 12D show a series of photographs of an oil stain, in accordance with one or more embodiments.
Figure 12B:
Figure 12C:
Figure 12D:
Figure 13A:
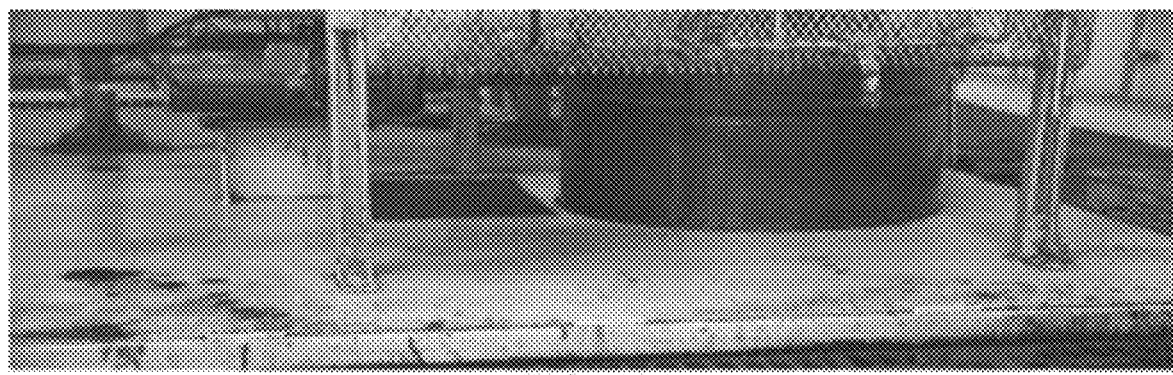
FIGS. 13A, 13B, 13C, and 13D show a series of photographs of an oil stain, in accordance with one or more embodiments.
Figure 13B:
Figure 13C:
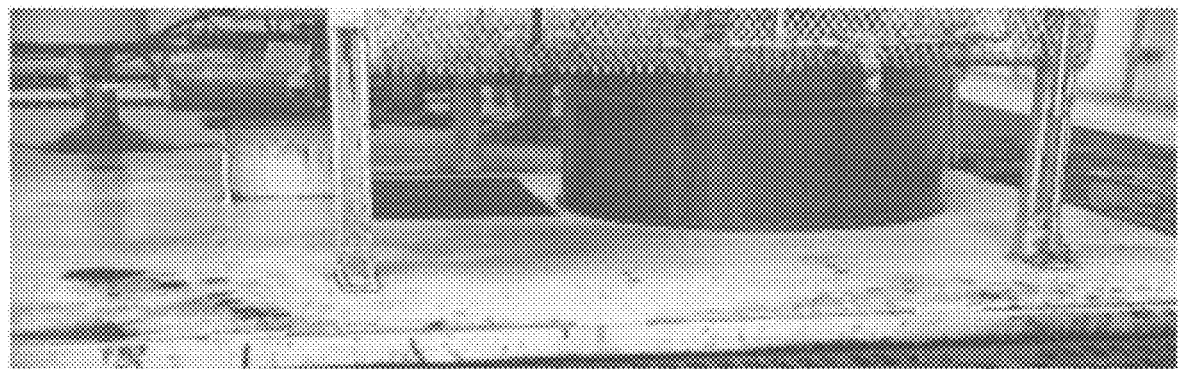
Figure 13D:
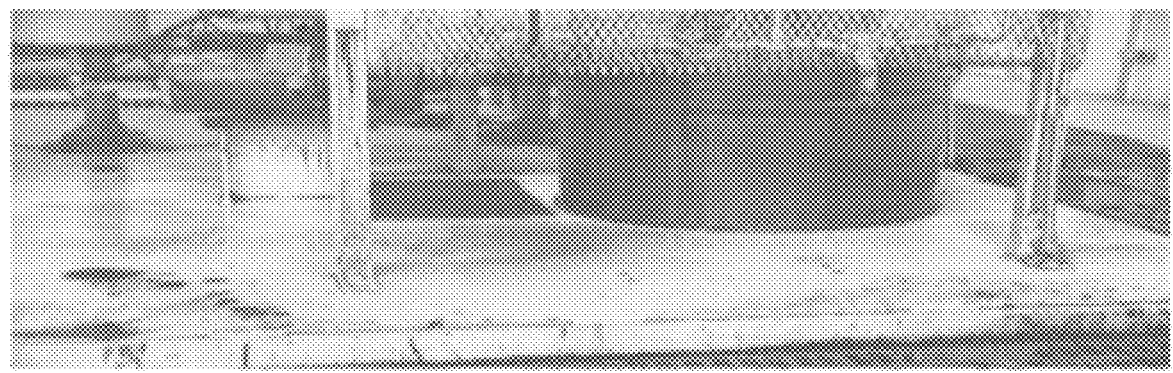
Figure 14A:
FIGS. 14A, 14B, 14C, and 14D show a series of photographs of an oil stain, in accordance with one or more embodiments.
Figure 14B:
Figure 14C:
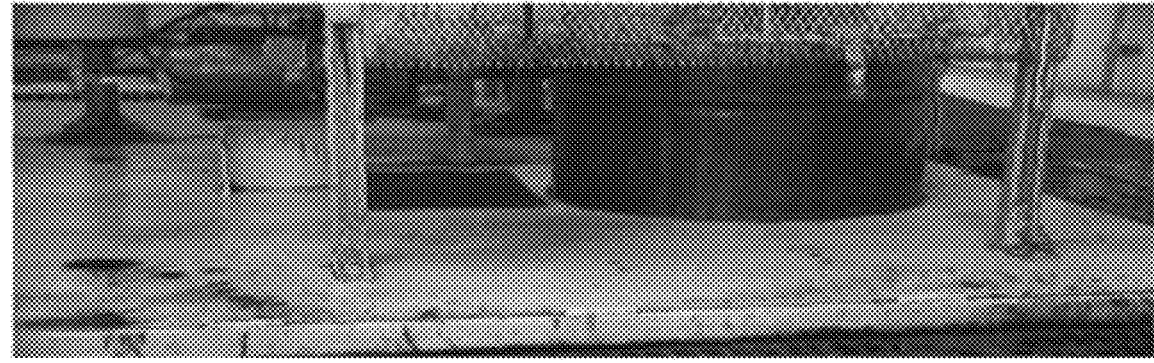
Figure 14D:
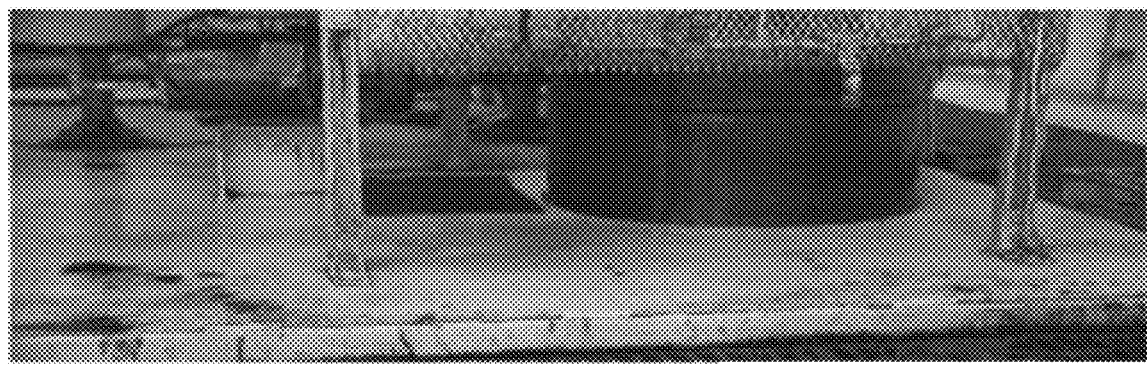
Figure 15A:
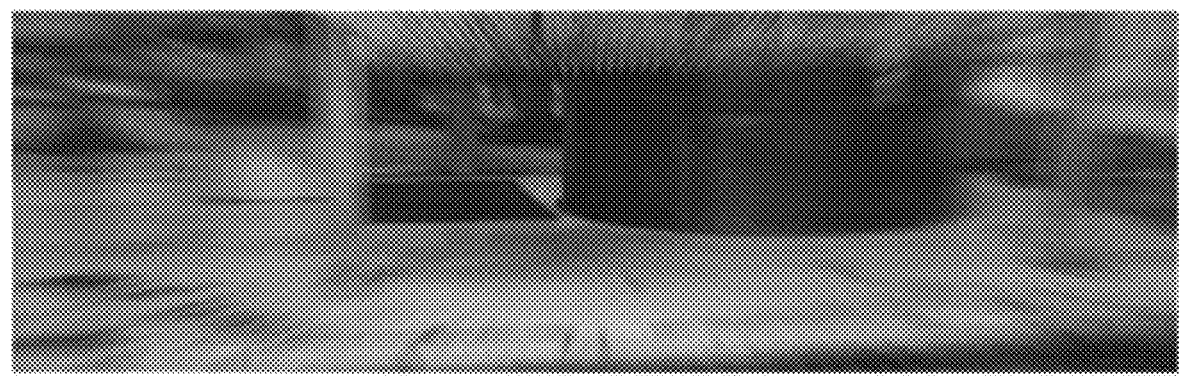
FIGS. 15A, 15B, 15C, and 15D show a series of photographs of an oil stain, in accordance with one or more embodiments.
Figure 15B:
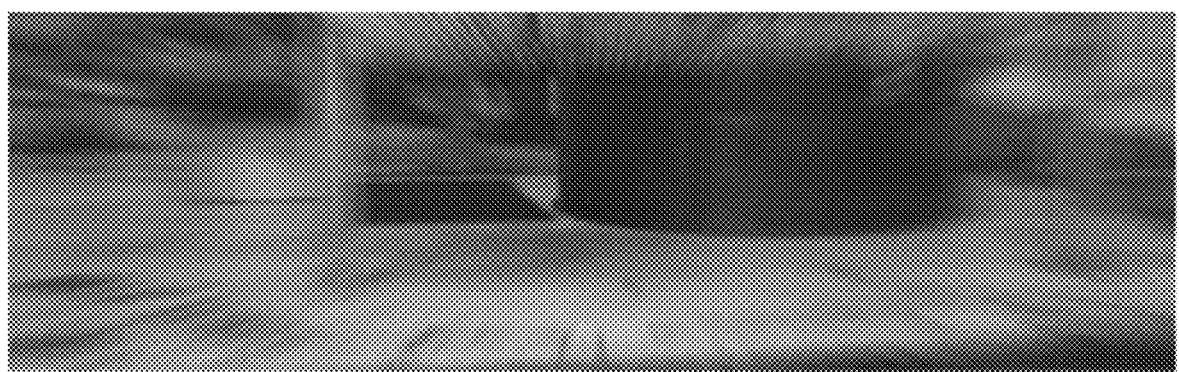
Figure 15C:
Figure 15D:
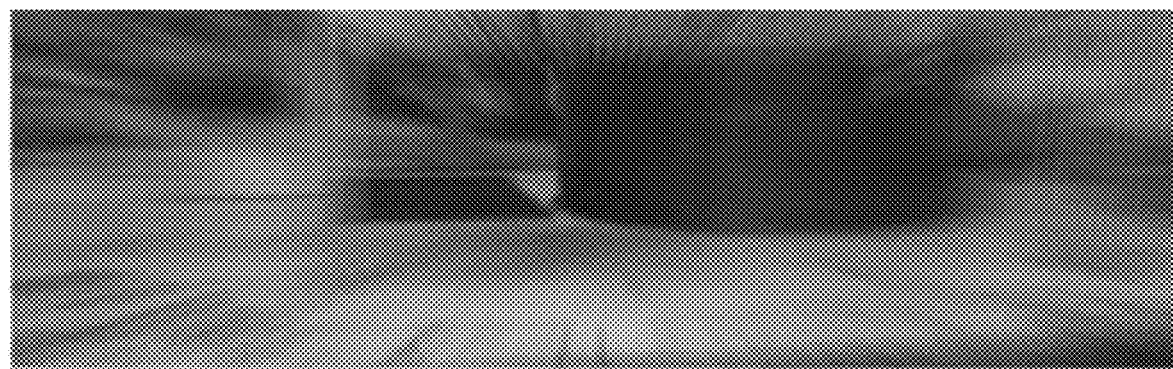

FIG. 6A shows the oil stain with minimal shot noise, presenting a clear and distinct image of the defect. FIG. 6B introduces a low level of shot noise slightly obscuring the finer details of the stain. The moderate shot noise of FIG. 6C further masking key features of the stain. FIG. 6D is augmented with an elevated level of shot noise, interfering with visual clarity, and representing a realistic, challenging industrial environment for training of the defect analysis model (116).

FIGS. 7A, 7B, 7C, and 7D show a series of photographs of an oil stain according to illustrative embodiments. Each successive image augmentation increases levels of defocus blur. Defocus blur is a blur degradation that results from lack of focus on an object. Used to train defect analysis model (116), FIGS. 7A, 7B, 7C, and 7D represent a variety of real-world conditions, enhancing the model's ability to identify and analyze defects under various levels of visual interference.

FIGS. 8A, 8B, 8C, and 8D, show a series of photographs of an oil stain according to illustrative embodiments. Each successive image augmentation increases levels of JPEG compression. JPEG compression is the amount of compression that is applied to the image to reduce the size of the image. By simulating JPEG compression, embodiments simulate the noise or lack of resolution caused by the compressed image. Used to train defect analysis model (116), FIGS. 8A, 8B, 8C, and 8D represent a variety of real-world conditions, enhancing the model's ability to identify and analyze defects under various levels of visual interference.

FIGS. 9A, 9B, 9C, and 9D, show a series of photographs of an oil stain according to illustrative embodiments. Each successive image augmentation increases levels of fog. The weather condition of fog is simulated digitally. Used to train defect analysis model (116), FIGS. 9A, 9B, 9C, and 9D represent a variety of real-world conditions, enhancing the model's ability to identify and analyze defects under various levels of visual interference.

FIGS. 10A, 10B, 10C, and 10D, show a series of photographs of an oil stain according to illustrative embodiments. Each successive image augmentation increases levels of motion blur. Motion blur is blur caused by a robotic platform moving when the image is captured. FIGS. 10A, 10B, 10C, and 10D represent a variety of real-world conditions that, when used to train defect analysis model (116), enhance the model's ability to identify and analyze defects under various levels of visual interference.

FIGS. 11A, 11B, 11C, and 11D, show a series of photographs of an oil stain according to illustrative embodiments. Each successive image augmentation increases levels of defocus blur. FIGS. 11A, 11B, 11C, and 11D represent a variety of real-world conditions that, when used to train defect analysis model (116), enhance the model's ability to identify and analyze defects under various levels of visual interference.

FIGS. 12A, 12B, 12C, and 12D, show a series of photographs of an oil stain according to illustrative embodiments. Each successive image augmentation increases levels of saturation. Used to train defect analysis model (116), FIGS. 12A, 12B, 12C, and 12D represent a variety of real-world conditions, enhancing the model's ability to identify and analyze defects under various levels of visual interference.

FIGS. 13A, 13B, 13C, and 13D, show a series of photographs of an oil stain according to illustrative embodiments. Each successive image augmentation increases levels of brightness. Used to train defect analysis model (116), FIGS. 13A, 13B, 13C, and 13D represent a variety of real-world conditions, enhancing the model's ability to identify and analyze defects under various levels of visual interference.

FIGS. 14A, 14B, 14C, and 14D, show a series of photographs of an oil stain according to illustrative embodiments. Each successive image augmentation increases levels of elastic transformation. Elastic transformations are non-linear warping of images. Elastic transformations mimic deformations that might naturally occur in real-world scenarios, such as stretching, squeezing, or twisting. Used to train defect analysis model (116), FIGS. 14A, 14B, 14C, and 14D represent a variety of real-world conditions, enhancing the model's ability to identify and analyze defects under various levels of visual interference.

FIGS. 15A, 15B, 15C, and 15D, show a series of photographs of an oil stain according to illustrative embodiments. Each successive image augmentation increases levels of zoom blur. Zoom blur is a blur caused by zooming into an object in the image. Zoom blur may occur when the robotic platform quickly zooms into objects. Used to train defect analysis model (116), FIGS. 15A, 15B, 15C, and 15D represent a variety of real-world conditions, enhancing the model's ability to identify and analyze defects under various levels of visual interference.

Figure 16A:
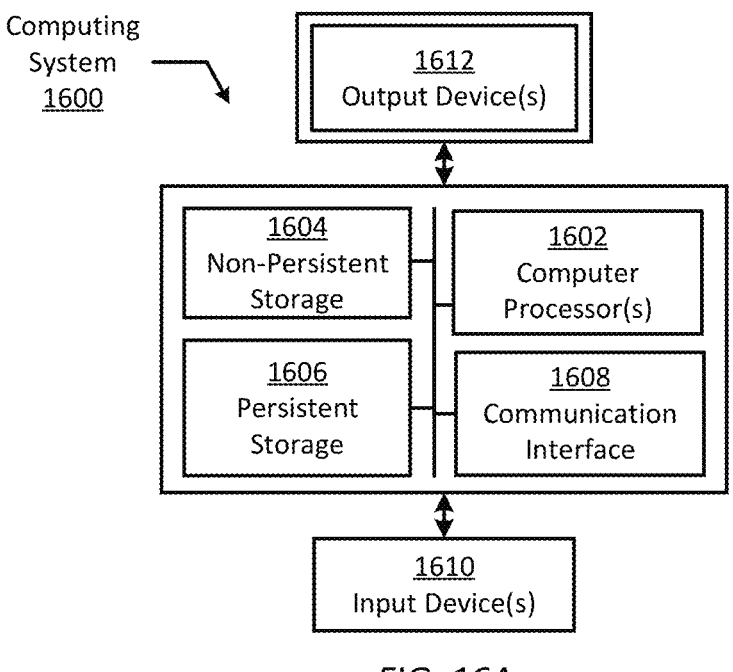
FIGS. 16A and 16B show a computing system and network environment, in accordance with one or more embodiments.

Embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 16A, the computing system (1600) may include one or more computer processors (1602), non-persistent storage (1604), persistent storage (1606), a communication interface (1608) (e.g., Bluetooth interface, infrared interface, network interface, optical interface, etc.), and numerous other elements and functionalities that implement the features and elements of the disclosure. The computer processor(s) (1602) may be an integrated circuit for processing instructions. The computer processor(s) may be one or more cores or micro-cores of a processor. The computer processor(s) (1602) includes one or more processors. The one or more processors may include a central processing unit (CPU), a graphics processing unit (GPU), a tensor processing unit (TPU), combinations thereof, etc.

The input devices (1610) may include a touchscreen, keyboard, mouse, microphone, touchpad, electronic pen, or any other type of input device. The input devices (1610) may receive inputs from a user that are responsive to data and messages presented by the output devices (1612). The inputs may include text input, audio input, video input, etc., which may be processed and transmitted by the computing system (1600) in accordance with the disclosure. The communication interface (1608) may include an integrated circuit for connecting the computing system (1600) to a network (not shown) (e.g., a local area network (LAN), a wide area network (WAN) such as the Internet, mobile network, or any other type of network) and/or to another device, such as another computing device.

Further, the output devices (1612) may include a display device, a printer, external storage, or any other output device. One or more of the output devices may be the same or different from the input device(s). The input and output device(s) may be locally or remotely connected to the computer processor(s) (1602). Many diverse types of computing systems exist, and the aforementioned input and output device(s) may take other forms. The output devices (1612) may display data and messages that are transmitted and received by the computing system (1600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 16B:
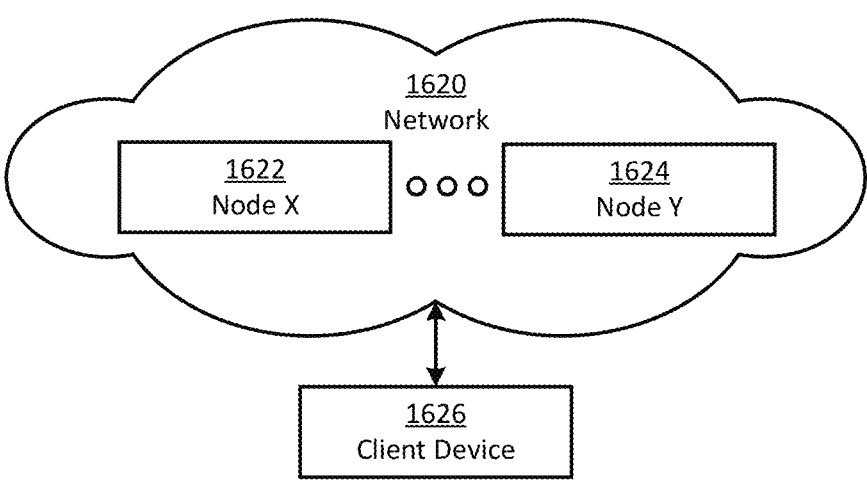

The computing system (1600) in FIG. 16A may be connected to or be a part of a network. For example, as shown in FIG. 16B, the network (1620) may include multiple nodes (e.g., node X (1622), node Y (1624)). Each node may correspond to a computing system, such as the computing system shown in FIG. 16A, or a group of nodes combined may correspond to the computing system shown in FIG. 16A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1600) may be located at a remote location and connected to the other elements over a network.

The nodes (e.g., node X (1622), node Y (1624)) in the network (1620) may be configured to provide services for a client device (1626), including receiving requests and transmitting responses to the client device (1626). For example, the nodes may be part of a cloud computing system. The client device (1626) may be a computing system, such as the computing system shown in FIG. 16A. Further, the client device (1626) may include and/or perform all or a portion of one or more embodiments.

The computing system of FIG. 16A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited by the attached claims.

What is claimed is:

1. A method for defect detection in industrial inspections, the method comprising:
    ingesting a plurality of images captured from a robotic platform equipped with imaging sensors to obtain a plurality of ingested images, wherein each of the plurality of ingested images depicts an object having a defect, and the robotic platform is a drone or an unmanned autonomous vehicle;
    analyzing the plurality of ingested images using an image analysis pipeline to generate a plurality of segmentation masks and a plurality of labeled images;
    simulating a plurality of environmental conditions in an environment shown in at least a subset of the plurality of ingested images to create an augmented plurality of labeled images, wherein the augmented plurality of labeled images comprises a plurality of different levels of added noise simulating different levels of visual interference in the environment; and
    training a defect analysis model with the augmented plurality of labeled images and the plurality of segmentation masks to identify a future defect in an industrial environment having varying visual interference.

2. The method of claim 1, wherein ingesting the plurality of images further comprises:

capturing the plurality of images of operations in the industrial environment from the robotic platform.

3. The method of claim 1, wherein the robotic platform is integrated with a cloud-based server for real-time data processing and storage.

4. The method of claim 1, wherein analyzing the plurality of images further comprises:
    automatically or semi-automatically labeling the plurality of images by the image analysis pipeline that is configured to recognize and classify the defect.

5. The method of claim 1, wherein simulating the plurality of environmental conditions further comprises:
    adjusting a plurality of parameters in the plurality of ingested images to mimic a plurality of operational conditions; wherein the plurality of environmental conditions comprise lighting variations, weather, wear of a camera, movement of the robotic platform, or a combination thereof, and wherein the plurality of environmental conditions comprise the levels of noise simulating different levels of visual interference.

6. The method of claim 1, wherein training the defect analysis model with the augmented plurality of labeled images reduces overfitting of the defect analysis model.

7. The method of claim 1, further comprising:
    continually training the defect analysis model as a plurality of new images are ingested, the plurality of new images comprising at least one new defect.

8. The method of claim 1, further comprising:
    receiving an input from a user defining the defect, wherein the defect comprises a leak, a crack, a structural weakness, or a combination thereof, and the input comprises one or more orientations, one or more positions, and one or more sizes of the defect; and
    updating defect identification and classification algorithms of the defect analysis model based on the input from the user.

9. The method of claim 1, further comprising:
    applying a super resolution technique to the augmented plurality of labeled images.

10. The method of claim 9, wherein the super resolution technique comprises processing the augmented plurality of labeled images to increase a resolution from the plurality of ingested images.

11. The method of claim 1, further comprising:
    ingesting a second set of images captured from a second robotic platform, wherein the second robotic platform is a drone or an unmanned autonomous vehicle;
    processing the second set of images with the defect analysis model to determine an identified defect, comprising:
        analyzing the second set of images using the image analysis pipeline to generate a second plurality of segmentation masks and a second plurality of labeled images;
        simulating the plurality of environmental conditions in a second environment shown in at least a second subset of the second set of images to create a second augmented plurality of labeled images;
        splitting the augmented plurality of labeled images and the second augmented plurality of labeled images into quadrilles; and
        determining statistics about the quadrilles; and
    generating an analytical report from the identified defect, wherein the analytical report includes at least one statistic of the determined statistics about the quadrilles of the identified defect.

12. The method of claim 11, wherein generating the analytical report includes compiling data on a type, a size, and a location of the identified defect.

13. A system for defect detection in industrial inspections the system comprising:

a robotic platform equipped with imaging sensors, wherein the robotic platform is a drone or an unmanned autonomous vehicle;

a computer processor; and a non-transitory computer-readable storage medium storing program code, which when executed by the computer processor, performs a plurality of operations comprising:

ingesting a plurality of images captured from the robotic platform to obtain a plurality of ingested images, wherein each of the plurality of ingested images depicts an object having a defect;

analyzing the plurality of ingested images using an image analysis pipeline to generate a plurality of segmentation masks and a plurality of labeled images;

simulating a plurality of environmental conditions in an environment shown in at least a subset of the plurality of ingested images to create an augmented plurality of labeled images, wherein the augmented plurality of labeled images comprises a plurality of different levels of added noise simulating different levels of visual interference in the environment; and training a defect analysis model with the augmented plurality of labeled images and the plurality of segmentation masks to identify a future defect in an industrial environment having varying visual interference.

14. The system of claim 13, wherein ingesting the plurality of images further comprises:

capturing the plurality of images of operations in an industrial environment from the robotic platform.

15. The system of claim 13, wherein analyzing the plurality of images further comprises:

automatically or semi-automatically labeling the plurality of images by the image analysis pipeline that is configured to recognize and classify the defect.

16. The system of claim 13, wherein simulating the plurality of environmental conditions further comprises:

adjusting a plurality of parameters in the plurality of ingested images to mimic a plurality of operational conditions, wherein the plurality of environmental conditions comprise lighting variations, weather, wear of a camera, movement of the robotic platform, or a combination thereof.

17. The system of claim 13, further comprising:

continually training the defect analysis model as a plurality of new images are ingested, the plurality of new images comprising at least one new defect.

18. The system of claim 13, further comprising:

receiving an input from a user defining the defect, wherein the defect comprises a leak, a crack, a structural weakness, or a combination thereof, and the input comprises one or more orientations, one or more positions, and one or more sizes of the defect; and updating defect identification and classification algorithms of the defect analysis model based on the input from the user.

19. The system of claim 13, in the operations for other comprise:

ingesting a second set of images captured from a second robotic platform;

processing the second set of images with the defect analysis model to determine an identified defect, comprising:

analyzing the second set of images using the image analysis pipeline to generate a second plurality of segmentation masks and a second plurality of labeled images;

simulating the plurality of environmental conditions in a second environment shown in at least a second subset of the second set of images to create a second augmented plurality of labeled images;

splitting the augmented plurality of labeled images and the second augmented plurality of labeled images into quadrilles; and determining statistics about the quadrilles; and generating an analytical report from the identified defect, wherein the analytical report includes at least one statistic of the determined statistics about the quadrilles of the identified defect.

20. A non-transitory computer-readable storage medium storing program code, which when executed by a computer processor, performs a plurality of operations comprising:

ingesting a plurality of images captured from a robotic platform to obtain a plurality of ingested images, wherein each of the plurality of ingested images depicts an object having a defect, and the robotic platform is a drone or an unmanned autonomous vehicle;

analyzing the plurality of ingested images using an image analysis pipeline to generate a plurality of segmentation masks and a plurality of labeled images;

simulating a plurality of environmental conditions in an environment shown in at least a subset of the plurality of ingested images to create an augmented plurality of labeled images, wherein the augmented plurality of labeled images comprises a plurality of different levels of added noise simulating different levels of visual interference in the environment; and training a defect analysis model with the augmented plurality of labeled images and the plurality of segmentation masks to identify a future defect in an industrial environment having varying visual interference.

* * * * *